United States Patent [19]

Remington

[11] 4,332,052
[45] Jun. 1, 1982

[54] SUPPORT ASSEMBLY FOR LUGGAGE

[75] Inventor: Richard C. Remington, Pompton Plains, N.J.

[73] Assignee: Presto Lock Company, Division of Walter Kidde & Company, Inc., Garfield, N.J.

[21] Appl. No.: 915,266

[22] Filed: Jun. 13, 1978

[51] Int. Cl.$^3$ .................. B60B 33/00; A47B 91/06
[52] U.S. Cl. ....................... 16/30; 16/42 R; 248/225.1
[58] Field of Search ............ 16/18 R, 29, 30, 42 R; 248/222.1, 223.4, 225.1

[56] References Cited

U.S. PATENT DOCUMENTS

| | | | |
|---|---|---|---|
| 550,239 | 11/1895 | Allen | 16/18 UX |
| 1,541,280 | 6/1925 | Replogle | 16/30 |
| 1,546,169 | 7/1925 | Dooley | 16/42 R |
| 1,709,972 | 4/1929 | Dibsdale | 16/30 |
| 2,478,563 | 8/1949 | Book | 16/30 |
| 2,661,220 | 12/1953 | Davis | 280/39 |
| 2,782,045 | 2/1957 | Hulbert | 16/18 R |
| 2,790,196 | 4/1957 | Rideout et al. | 16/30 |
| 2,800,679 | 7/1957 | Schultz, Jr. | 16/30 X |
| 2,952,343 | 9/1960 | Modrey | 248/223.4 X |
| 3,254,362 | 6/1966 | Rasor et al. | 16/42 |
| 3,935,613 | 2/1976 | Kaneko | 16/30 |
| 3,947,917 | 4/1976 | Schwartzstein et al. | 16/30 |
| 3,987,875 | 10/1976 | Szabo | 16/30 X |
| 4,026,570 | 5/1977 | Feinberg | 16/30 X |
| 4,150,381 | 4/1979 | Verini | 248/223.4 X |

FOREIGN PATENT DOCUMENTS 1593521  6/1970  France .

Primary Examiner—Wm. Carter Reynolds
Attorney, Agent, or Firm—Shapiro and Shapiro

[57] ABSTRACT

A support assembly for luggage comprises a base plate adapted to be attached to a suitcase, for example, and a support unit, including a caster or runner, that is removably attached to the base plate. The base plate has opposed channels along its longitudinal edges into which the support unit is inserted longitudinally. A stop at the trailing end of the support unit limits insertion of the support unit into the channels, and a latch at the leading end of the support unit prevents unintentional withdrawal of the support unit from the channels.

20 Claims, 6 Drawing Figures

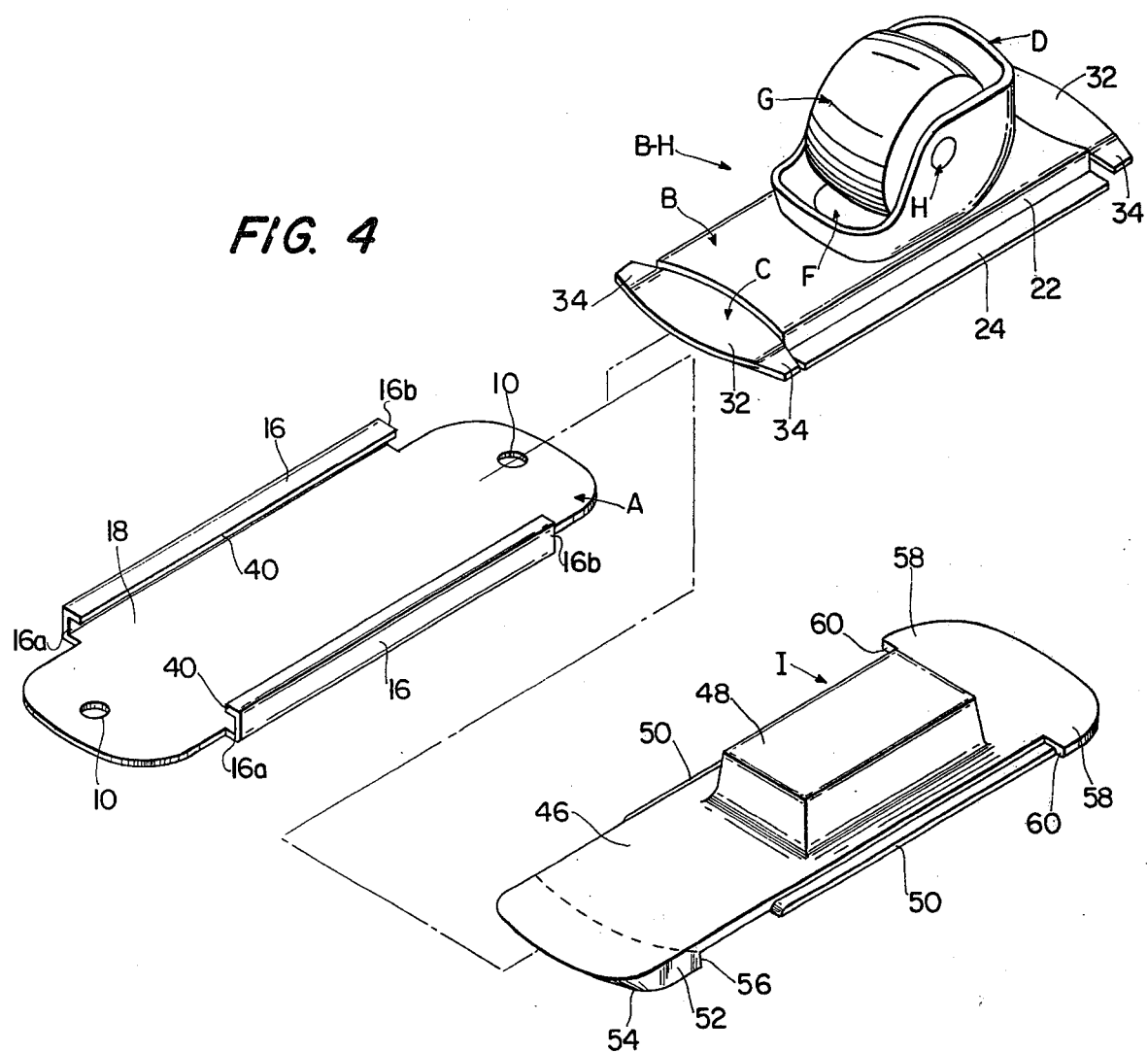
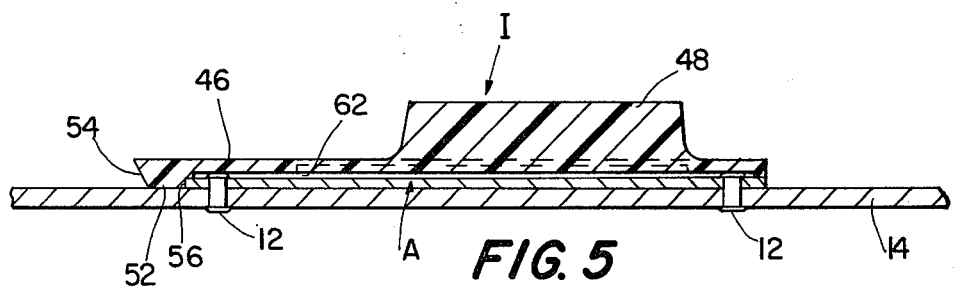
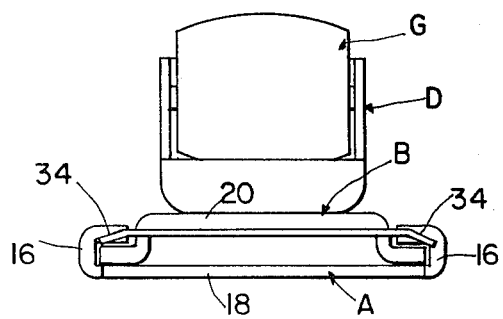

SUPPORT ASSEMBLY FOR LUGGAGE

BACKGROUND OF THE INVENTION

This invention relates to support assemblies and is more particularly concerned with removable supports for luggage and the like.

The application of casters to luggage, especially to larger suitcases, enjoys wide popularity. The ability to move heavily loaded suitcases on wheels is highly advantageous to travelers. However, there are times when wheels are unnecessary and when easy removal of luggage casters is desirable. It is also desirable to be able to employ removable casters and stationary runners on luggage interchangeably.

There have been many prior proposals for the provision of detachable supports, such as casters, for luggage. For example, U.S. Pat. No. 4,026,570, assigned to the same assignee as the present invention, discloses a wheel unit with lugs that are inserted into slots of a base plate, the wheel unit being retained upon the base plate by a spring engaging one of the lugs. In the support of U.S. Pat. No. 3,947,917 a runner for luggage provides a stud to which a caster may be attached by means of a spring clip or slidable bolt member. U.S. Pat. No. 3,935,613 discloses a support assembly for luggage in which a base plate has a resilient member that becomes latched to a detachable roller unit. Similarly, in U.S. Pat. No. 3,987,875 a base plate has integrally molded projections that latch onto a detachable roller unit. Casters with resilient latches for holding the casters in receptacles are disclosed by U.S. Pat. Nos. 1,541,280 and 2,478,563. The caster of U.S. Pat. No. 2,800,679 has flanges that enter channels of a mounting plate and that are retained therein merely by friction.

The goals to be achieved in the provision of a satisfactory removable luggage caster are, to some extent, at cross purposes. On the one hand, the entire caster assembly should be economical to manufacture, and the removable caster portion should be easy to attach to luggage and easy to remove. On the other hand, the caster assembly should be strong enough to withstand heavy loads and high impact forces, and the removable caster portion should not become detached unintentionally. Prior removable luggage casters fail to achieve all of these goals. Furthermore, in the prior art a base plate that is permanently attached to the luggage commonly includes a mechanism with moving parts to engage and hold the removable caster unit. If the mechanism fails, it is necessary to replace the base plate, and this may involve removing rivets from the base plate and the luggage.

BRIEF DESCRIPTION OF THE INVENTION

It is accordingly a principal object of the present invention to provide an improved support assembly for luggage and the like.

A further object of the invention is to provide an improved structure which permits casters or stationary runners to be removably attached to luggage interchangeably.

Yet another object of the invention is to provide devices of the foregoing type in which a base plate permanently attached to luggage has no moving parts and is exceptionally rugged.

Still another object of the invention is to provide support assemblies for luggage and the like in which a removable caster unit or runner is easily attached to a base plate, is easily detached from the base plate, but only when detachment is intended, and forms an exceptionally strong assembly with the base plate.

Briefly stated, a preferred embodiment of a support assembly in accordance with the invention comprises a base plate adapted to be attached to an object to be supported and having a pair of parallel channels with an open end, and a support unit adapted to be removably attached to the base plate, the support unit including a frame plate adapted to be inserted in the open end of the channels and retained by the channels, releasable latch means at a leading end of the frame plate for preventing unintentional withdrawal of the frame plate from the channels, and stop means for limiting the insertion of the frame plate into the channels.

BRIEF DESCRIPTION OF THE DRAWINGS

The invention will be further described in conjunction with the accompanying drawings, which illustrate preferred and exemplary embodiments with the parts shown inverted from normal positions assumed while serving as supports, and wherein:

FIG. 4 is a perspective view illustrating a removable caster unit and a runner unit used alternatively in conjunction with the same base plate in accordance with the invention;

FIG. 5 is a longitudinal sectional view illustrating a support assembly including a removable runner unit attached to luggage in accordance with the invention; and FIG. 6 is an end view of the assembly of FIG. 2.

DETAILED DESCRIPTION OF THE INVENTION

Figure 1:
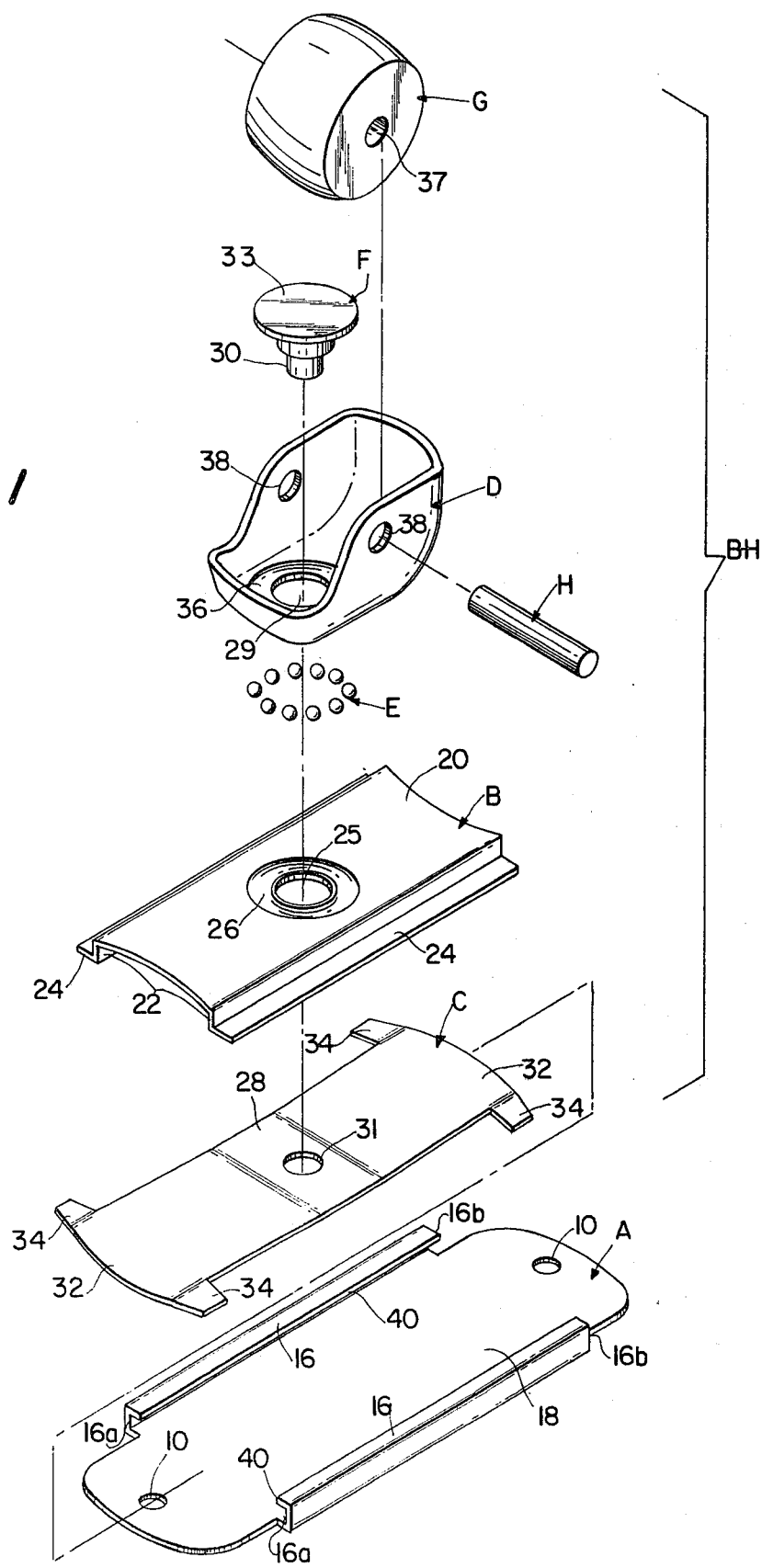
FIG. 1 is an exploded perspective view of a support assembly including a removable caster unit in accordance with the invention.
Figure 2:
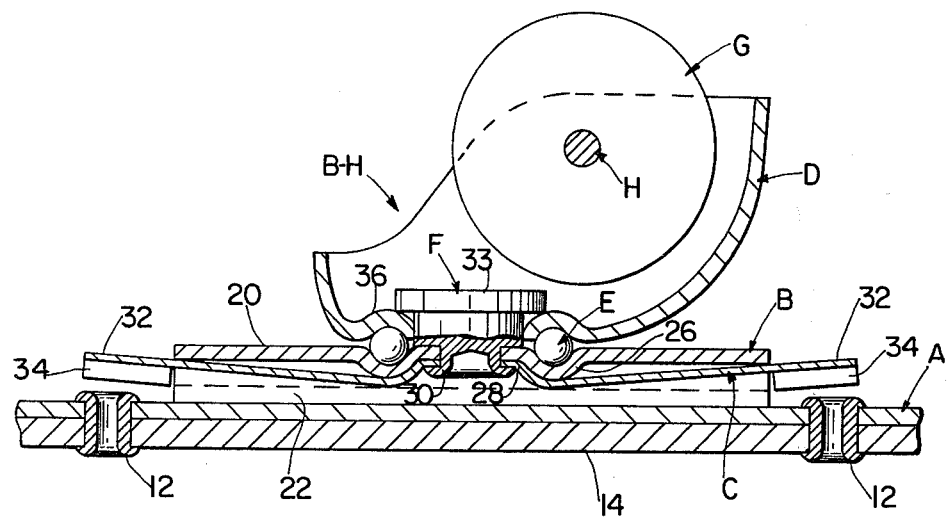
FIG. 2 is a longitudinal sectional view showing the support assembly of FIG. 1 attached to luggage.

As shown in FIG. 1, a support assembly in accordance with the invention may comprise a base plate A and a detachable caster unit BH, which is shown as a swivel caster unit, although a stationary caster unit may be employed, as later described. The caster unit BH includes a frame plate B, a spring plate C, a roller housing D, bearings E, a kingpin F, a roller G, and an axle H. All of the parts shown, except roller G, are preferably formed of metal, such as chromium-plated steel. Base plate A is preferably of elongated, generally rectangular configuration and should be rugged enough to provide a strong foundation for the remainder of the device. Holes 10 near the opposite ends of the base plate receive rivets 12 or other suitable fasteners, as shown in FIG. 2, for attaching the base plate to a bottom wall 14 of a suitcase, for example. Bent from opposite longitudinal edges of the base plate A are opposed, generally U-shaped channels 16. The channels are open-ended and have open sides facing one another as shown in FIG. 1. In the preferred form of the invention the channels terminate short of the opposite ends of the major wall 18 of the base plate, depending from the base plate when the base plate is inverted to assume its normal orientation in use.

Frame plate B is also preferably of elongated, generally rectangular configuration and is preferably somewhat shorter than base plate A. In the form shown frame plate B has a generally U-shaped cross section (inverted in FIG. 1) with a main wall 20, the ends of which may be slightly concave, as shown, and with arms 22 bent perpendicularly from main wall 20 and having substantially planar longitudinal edge portions in the form of outwardly projecting longitudinal flanges 24 forming the longitudinal edges of the frame plate. Frame plate B has a central opening 25 surrounded by a circular depression 26, in the form shown, to receive ball bearings E when the frame plate is assembled with roller shell D.

Spring plate C is also preferably of generally rectangular configuration and may be formed of annealed spring steel, for example. The spring plate has a central region 28 which becomes affixed to frame plate B when the kingpin F passes through hole 29 in roller shell D, hole 25 in frame plate B, and hole 31 in spring plate C to join these parts as shown in FIG. 2. For this purpose one end of the kingpin may be formed as a rivet 30, as shown in FIG. 2, and the other end formed as a head 33.

Spring plate C has terminal portions 32 at its opposite ends and is preferably bent as shown in FIG. 2 so that the terminal portions 32 are normally closer to the main wall 20 of frame plate B than the portions of the spring plate between terminal portions 32 and central portion 28. By virtue of this construction, the terminal portions 32 may be resiliently flexed away from the frame plate B. Terminal portions 32 are preferably somewhat convex, as shown in FIG. 1, and cooperate with the concavity at the ends of frame plate B in providing significant spring plate areas available for manual contact. Each terminal portion 32 has a pair of tabs 34 at opposite sides thereof. As shown in FIG. 6, tabs 34 are bent away from the main wall 20 of frame plate B.

Roller shell D may have a conventional configuration. For example, the roller shell may be somewhat cup-shaped as shown or may simply be a U-shaped yoke having arms between which the roller G is mounted. The side of the roller shell facing frame plate B may have a circular depression 36 which surrounds hole 29 and which, together with depression 26 of frame plate B, receives and retains the ball bearings E, as shown in FIG. 2. Other types of bearing arrangements also may be used, of course. Roller G, which may be formed of rubber or plastic, for example, has a central bore 37 which receives axle pin H on which the roller rotates. The axle may be mounted in openings 38 at opposite sides of the roller shell and may be expanded at its opposite ends to retain the axle on the roller shell.

The completed caster unit BH is shown in FIG. 4 in association with the base plate A and a stationary runner unit I described hereinafter. To attach the caster unit to the base plate, the caster unit is moved endwise (longitudinally) toward the base plate so that tabs 34 at a leading end of the caster unit enter an open end of channels 16 (either end of the channels). Continued movement of the caster unit BH in this manner inserts the flanges 24 into the channels also. As the tabs 34 at the leading end of the caster unit enter channels 16, followed by flanges 24, terminal portion 32 at the leading end is flexed away from the frame plate B. Introduction of this terminal portion into the channels is facilitated by tilting the caster unit BH slightly so that the caster unit engages base plate A with a slight inclination towards main wall 18 of the base plate. As flanges 24 enter the channels, the caster unit levels off and the leading terminal portion 32 is depressed.

Continued insertion of caster unit BH into channels 16 causes the leading terminal portion 32 to pass completely through the channels, whereupon the pressure of the channels on the tabs 34 of the leading terminal portion is relieved, and the leading terminal portion snaps away from main wall 18 of the base plate, so that the associated tabs are positioned for engagement with an abutment 16a constituted by the adjacent end of channels 16, to prevent withdrawal of the caster unit backwardly through the channels.

Further insertion of the caster unit into channels 16 is prevented by engagement of the tabs 34 of the trailing terminal portion 32 with an abutment 16b constituted by the end of channels 16 adjacent to these tabs, which thus form stops to limit the insertion of the caster unit into the channels of the base plate. The construction of the caster unit BH, and also the base plate A, is preferably identical at opposite ends, so that the tabs 34 of either terminal portion 32 may be the "stops". Similarly, either terminal portion and its tabs may form a releasable latch which prevents withdrawal of the caster unit from the channels. Thus, either end of the caster unit may be the "leading" end and either end the "trailing" end. (It will be noted from the foregoing, that to permit lengthwise insertion of the caster unit into the base plate, the leading end tabs, which constitute a latch means, flex in a direction substantially perpendicular to the plane of flanges 24 forming the longitudinal edge portions of the frame plate.)

As is apparent in FIG. 2, when the caster unit BH has been fully engaged with the base plate A, both terminal portions 32 assume essentially the same position. The tabs 34 of each terminal portion 32 are therefore positioned to engage the corresponding end of the channels 16, so that no significant end-wise (longitudinal) movement of the caster unit BH relative to the base plate A is possible.

The U-shaped configuration of the frame plate B provides a strong structure which resists deformation. When the caster unit BH is assembled with the base plate A, flanges 24 are trapped in channels 16 and arms 22 of the frame plate are located adjacent to the free edges 40 of the channels, so that frame plate B is embraced by base plate A along the longitudinal edges of the frame plate. Channels 16 are embraced between the tabs 34 at opposite ends of the spring plate C (that is affixed to frame plate B by kingpin F) and the spring plate fits the configuration of frame plate B. There is very little play between the caster unit BH and the base plate A. The result of this arrangement is a support structure that is economical to manufacture, is very strong, and yet is easy to use. To remove the caster unit BH from base plate A, it is only necessary to depress either one of the terminal portions 32 of spring plate C so that the associated tabs 34 can be withdrawn into the channels 16 as caster unit BH is moved longitudinally to withdraw flanges 24 from the channels.

The preferred configuration of frame plate B not only has the virtue of strength but also provides clearance relative to the base plate so that the caster unit may be readily passed over the heads of rivets 12 or other fasteners as the caster unit is engaged with or disengaged from the base plate. The ability of the caster unit to engage with the base plate longitudinally permits contact of the channels of the base plate with the flanges of the frame plate along the longer (longitudinal) edges of both plates, providing a much more rigid mounting arrangement than is possible with prior art structures in which the caster unit is constrained to enter base plate channels laterally in order to avoid rivets at the ends of the base plate.

Figure 3:
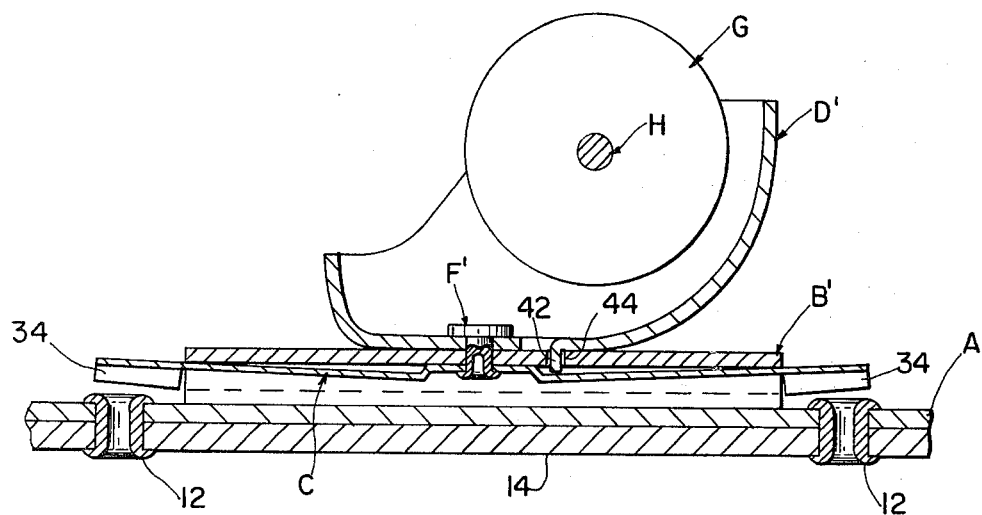
FIG. 3 is a similar view of a modification.

The structure of the invention illustrated in FIGS. 1 and 2 comprises a swivel caster in which the roller housing D may turn about the axis of kingpin F. It is common practice to employ two or more casters in the support of luggage or other objects and the casters may be swivel casters and/or so-called rigid casters. With a slight modification, the support assembly of the invention may include a rigid caster. As shown in FIG. 3 the roller housing D' for a rigid caster embodiment may be provided with a lug 42 that enters a corresponding slot 4 in a frame plate B'. When the roller housing D' is then affixed to frame plate B' by a simple rivet F', for example, lug 42 enters slot 44 and prevents rotation of roller housing D' relative to frame plate B'. If desired, a "universal" frame plate may be used for both swivel and rigid casters, a circular bearing recess 26 and a slot 44 being provided on all frame plates and the same size kingpin or rivet being employed for both types of casters.

There are occasions when support of luggage and the like on wheels or rollers is unnecessary. It is thus desirable to have simple runner units that are interchangeable with the removable caster units of the invention. This may be accomplished as shown in FIGS. 4 and 5. Runner unit I may be a single piece of molded Delrin or other plastic or other suitable material having a certain amount of inherent bending flexibility and resiliency in its frame plate 46 (that term being employed to describe any plate or similar member that is removably attached to the base plate A in accordance with the invention).

In the form shown, the runner or support foot per se is a generally rectangular block 48 projecting from one side of frame plate 46. Opposite longitudinal edges of frame plate 46 have flanges 50 that are dimensioned and positioned to perform the functions of flanges 24 of caster unit BH. Opposite ends of frame plate 46 are preferably smoothly convexly curved as shown. At one end there is a protuberance 52 projecting from one side of frame plate 46 and having a smoothly tapered edge 54, which may be termed the leading edge of the protuberance. The opposite or trailing edge 56 of the protuberance is concave, the concave curvature preferably matching the convex curvature at the ends of main wall 18 of base plate A. At the opposite end of the frame plate 46 there are ears 58 providing laterally projecting abutments 60.

To assemble the runner unit I with the base plate A, the runner unit is moved end-wise (longitudinally) toward either end of the base plate, with edge 54 leading. The leading end of the frame plate 46 moves between channels 16. Flanges 50 enter one end of channels 16, with protuberance 52 engaging the adjacent surface of main wall 18 of the base plate and flexing the leading end of frame plate 46 away from the main wall of the base plate. Ultimately, the leading end of frame plate 46 passes from between channels 16, and as protuberance 52 approaches and then passes an end of the base plate, the portion of frame plate 46 behind protuberance 52 snaps into flush engagement with the base plate. Concave edge 56 of protuberance 52 is then located just beyond a corresponding convex end of the base plate as shown in FIG. 5, forming a latch that prevents withdrawal of the runner unit backwardly through the channels. At the opposite end of the base plate, abutments 60 of ears 58 are located adjacent to an end of channels 16, forming stops which limit the insertion of the runner unit into the channels. To remove the runner unit from the base plate, pressure is exerted on the protuberance 52 to deflect the protuberance sufficiently to clear the adjacent edge of the base plate. The runner unit may then be withdrawn from the base plate in a direction opposite to the original insertion direction. In order to provide clearance with respect to rivet heads and the like, the side of frame plate 46 that faces the main wall 18 of the base plate preferably has a central longitudinal groove 62 as shown in FIG. 5.

Although the illustrated configuration of the runner unit is preferred, other configurations which provide the desired latch and stop actions may be employed. For example, the runner unit may have the same protuberance structure 52 at its opposite ends engaging corresponding ends of the base plate. Furthermore, with a support unit which latches over an end edge of the base plate, as in FIG. 5, the channels 16 need only be open at one end. Although a plastic runner unit is preferred, a metal runner unit with the necessary resiliency could be employed, being provided with a suitable rubber or plastic foot if desired.

It is believed that the advantages and improved results furnished by the support assembly of the invention will be apparent from the foregoing description of preferred embodiments of the invention. Various changes and modifications may be made without departing from the spirit and scope of the invention as defined in the following claims.

What is claimed is:

1. A support assembly comprising a base plate adapted to be attached to an object to be supported and having a pair of parallel channels with open ends, a support unit adapted to be removably attached to the base plate, the support unit including a frame plate having substantially planar opposite edge portions adapted to be retained by the channels upon lengthwise insertion of the frame plate into the channels, releasable latch means at a leading end of the frame plate, said latch means being adapted to flex in a direction substantially perpendicular to the plane of said edge portions to permit lengthwise insertion of the frame plate into said channels from one end of the channels, the latch means being further adapted to emerge from the opposite end of said channels and return to an unflexed condition upon continued insertion of the frame plate, abutment means on said base member for engaging said latch means upon emergence of the latch means from the channels and return of the latch means to the unflexed condition, said abutment means preventing unintentional withdrawal of the frame plate from the channels, and cooperative stop means on the frame plate and base plate for limiting insertion of the frame plate into the channels and substantially preventing lengthwise movement of the frame plate relative to the base plate when said latch means is in engagement with said abutment means, the latch means being disengageable from the abutment means for withdrawal of the frame plate from the base plate by flexure of the latch means in said direction.

2. A support assembly in accordance with claim 1, wherein the channels are bent from opposite edges of the base plate so as to depend therefrom and are open at opposite ends, each channel having an open side facing and spaced from an open side of the other channel, and wherein the latch means comprises means engageable with one channel end and the stop means comprises means engageable with an opposite channel end which defines the abutment means.

3. A support assembly in accordance with claim 1, wherein the support unit comprises a roller and means for rotatably mounting the roller on the frame plate.

4. A support assembly in accordance with claim 1, wherein the support unit comprises a runner fixed to the frame plate.

5. A support assembly in accordance with claim 1, wherein the latch means comprises a spring plate secured to the frame plate and having a terminal portion extending beyond the leading end of the frame plate, the terminal portion having a tap that enters one end of a corresponding channel of the base plate and is depressed thereby to flex the spring plate when the frame plate is inserted in the channels of the base plate, the spring plate returning to the unflexed condition when the tab passes out of the opposite end of said corresponding channel, thereby positioning the tab to engage said abutment means on the base plate.

6. A support assembly in accordance with claim 5, wherein the stop means comprises a terminal portion at the trailing end of the spring plate having a tab adapted to engage an abutment on the base plate.

7. A support assembly in accordance with claim 1, wherein the latch means comprises a protuberance at one end of the frame plate that snaps over a corresponding end of the base plate when the frame plate is inserted into the channels of the base plate.

8. A support assembly in accordance with claim 7, wherein the stop means comprises an abutment on the frame plate that engages an end of one of the channels.

9. A support assembly comprising a base plate adapted to be attached to an object to be supported and having a pair of parallel channels with an open end, and a support unit adapted to be removably attached to the base plate, the support unit including a frame plate adapted to be inserted in the open end of the channels and retained by the channels, releasable latch means at a leading end of the frame plate for preventing unintentional withdrawal of the frame plate from the channels, and stop means for limiting the insertion of the frame plate into the channels, wherein the channels are open at opposite ends and wherein the latch means comprises a spring plate secured to the frame plate and having a terminal portion extending beyond the leading end of the frame plate, the terminal portion having a tab that enters one end of a corresponding channel of the base plate and is depressed thereby to flex the spring plate when the frame plate is inserted in the channels of the base plate, the spring plate returning to an unflexed condition when the tab passes out of the opposite end of said corresponding channel, thereby positioning the tab to engage an abutment on the base plate, wherein the frame plate has a generally U-shaped cross-section with arms along and substantially perpendicular to a main well, wherein the spring plate fits between the arms of the frame plate, the arms having outwardly directed flanges, respectively, adapted to enter the channels, respectively, and wherein the stop means comprises a terminal portion of the spring plate extending beyond the trailing end of the frame plate, the central portion of the spring plate being secured to the frame plate, and the spring plate being bent so that the terminal portions are closer to the main wall of the frame plate than portions of the spring plate between the terminal portions and the central portion in order that the terminal portions may be resiliently flexed away from the main wall of the frame plate, each terminal portion having a pair of opposite tabs adjacent to the ends of the respective arms of the frame plate and bent away from the main wall of the frame plate.

10. A removable support unit for use with a separate base plate having a pair of parallel open-ended channels, the support unit comprising a frame plate having planar edge portions adapted to be inserted lengthwise into either open end of the channels and be retained by the channels, releasable latch means at a leading end of the frame plate, the latch means being adapted to flex in a direction perpendicular to the plane of said edge portions to permit insertion of the frame plate into the channels, the latch means emerging from the channels and returning to a relaxed condition on further insertion of the frame plate, abutment means on the base plate adapted to engage the latch means on emergence of the latch means from the channels for preventing unintentional withdrawal of the frame plate from the channels, and stop means at the trailing end of the frame plate for limiting the insertion of the frame plate into the channels and substantially preventing lengthwise movement of the frame plate relative to the base plate when the latch means is in engagement with the abutment means.

11. A removable support unit in accordance with claim 10, wherein the latch means comprises a spring plate secured to the frame plate and having a terminal portion extending beyond the leading end of the frame plate, the terminal portion having tabs adapted to enter one end of corresponding channels of the base plate and to be depressed thereby to flex the spring plate when the frame plate is inserted in the channels of the base plate, the spring plate being adapted to return to an unflexed condition when the tabs pass out of the opposite end of the channels, thereby positioning the tabs to engage that end of the channels.

12. A removable support unit for use with a separate base plate having a pair of parallel open-ended channels, the support unit comprising a frame plate adapted to be inserted in an open end of the channels and retained by the channels, releasable latch means at a leading end of the frame plate for preventing unintentional withdrawal of the frame plate from the channels, and stop means at the trailing end of the frame plate for limiting the insertion of the frame plate into the channels, wherein the latch means comprises a spring plate secured to the frame plate and having a terminal portion extending beyond the leading end of the frame plate, the terminal portion having tabs adapted to enter one end of corresponding channels of the base plate and to be depressed thereby to flex the spring plate when the frame plate is inserted in the channels of the base plate, the spring plate being adapted to return to an unflexed condition when the tabs pass out of the opposite end of the channels, thereby positioning the tabs to engage that end of the channels, wherein the frame plate has a generally U-shaped cross-section with arms along and substantially perpendicular to a main wall, wherein the spring plate fits between the arms of the frame plate, the arms having outwardly directed flanges, respectively, adapted to enter the channels, respectively, and wherein the stop means comprises a terminal portion of the spring plate extending beyond the trailing end of the frame plate, the central portion of the spring plate being secured to the frame plate, and the spring plate being bent so that the terminal portions are closer to the main wall of the frame plate than portions of the spring plate between the terminal portions and the central portion in order that the terminal portions may be resiliently flexed away from the main wall of the frame plate, each terminal portion having a pair of opposite tabs adjacent to the ends of the respective arms of the frame plate and bent away from the main wall of the frame plate.

13. A removable support unit for use with a separate base plate having a pair of parallel open-ended channels, the support unit comprising a frame plate having planar edge portions adapted to be inserted in an open end of the channels and retained by the channels, releasable latch means at a leading end of the frame plate for preventing unintentional withdrawal of the frame plate from the channels, and stop means for limiting the insertion of the frame plate into the channels, the latch means comprising a protuberance at the leading end of the frame plate adapted to flex in a direction perpendicular to the plane of said edge portions to permit insertion of the frame plate in the channels and to emerge from the channels and snap over a corresponding end of the base plate when the frame plate is further inserted into the channels, and the stop means comprising an abutment at the trailing end of the frame plate adapted to engage an abutment on the base plate.

14. A removable support unit in accordance with claim 13, wherein the abutment at the trailing end of the frame plate is one of a pair of frame plate abutments adapted to engage abutments on the base plate constituted by an end of the channels.

15. A removable support unit in accordance with claim 14, wherein the frame plate has flanges along opposite edges adapted to enter the channels, an integral runner, is formed of plastic, and has sufficient resilience to permit the protuberance to snap over an end of the base plate resiliently.

16. A support assembly comprising a base plate adapted to be attached to an object to be supported and having a pair of parallel channels with an open end, and a support unit adapted to be removably attached to the base plate, the support unit including a frame plate adapted to be inserted in the open end of the channels and retained by the channels, releasable latch means at a leading end of the frame plate for preventing unintentional withdrawal of the frame plate from the channels and stop means for limiting the insertion of the frame plate into the channels, wherein the frame plate has a generally U-shaped cross-section with arms along and substantially perpendicular to a main wall, the arms having outwardly directed flanges substantially parallel to the main wall and adapted to be inserted lengthwise into the channels, the main wall including mounting means for a support element, and wherein the latch means and stop means are formed at opposite ends of a spring plate attached to the frame plate, the spring plate extending lengthwise of the frame plate between said arms.

17. A support assembly comprising a base plate adapted to be attached to an object to be supported and having a pair of parallel channels open at one end, a support unit adapted to be removably attached to the base plate by insertion of the frame plate lengthwise into the channels, and means permitting insertion of the frame plate into the channels using either one of a pair of opposite ends of the frame plate as a leading end and for releasably latching the frame plate to the base plate when inserted therein, said last-named means comprising means at each of said ends of the frame plate usable selectively as a releasable latch means when at the leading end of the frame plate for preventing unintentional withdrawal of the frame plate from the channels and as a stop means when at the trailing end of the frame plate for limiting insertion of the frame plate into the channels.

18. A support assembly as claimed in claim 17, wherein the channels are open at both ends whereby the frame plate can be inserted from either end of the channels.

19. A support assembly as claimed in claim 18, wherein said means at each of said ends of the frame plate are adapted to be located outside of the opposite ends of the channels and cooperate with the opposite ends of the channels to provide said latch and stop means respectively when the frame plate is inserted in the base plate.

20. A support assembly as claimed in claim 17 including a spring plate attached to a main wall of the frame plate for flexing movement in a direction substantially perpendicular to the plane of said main wall, the spring plate having terminal portions located at the respective ends of the frame plate, the terminal portions defining said means usable selectively as a latch means and as a stop means.

* * * * *